Oct. 29, 1929.  W. H. LAWLEY  1,733,415
SPRING WIRE CLIP
Filed Nov. 15, 1928

INVENTOR
W. H. LAWLEY

Patented Oct. 29, 1929

1,733,415

UNITED STATES PATENT OFFICE

WILLIAM HARRY LAWLEY, OF PENZANCE, ENGLAND

SPRING WIRE CLIP

Application filed November 15, 1928. Serial No. 319,671.

This invention relates to spring wire clips, the chief object being to provide a simple and efficient constructional form of device of this character for use more particularly, but not exclusively, in connection with the securing of magneto high tension cables to the sparking plugs of internal combustion engines without the necessity of employing nuts and washers or like devices for this purpose, the clip according to this invention being readily attached to or detached from the sparking plug or other member with which it co-operates.

The invention is illustrated, by way of example, with reference to the accompanying drawing, in which:—

Figure 1:
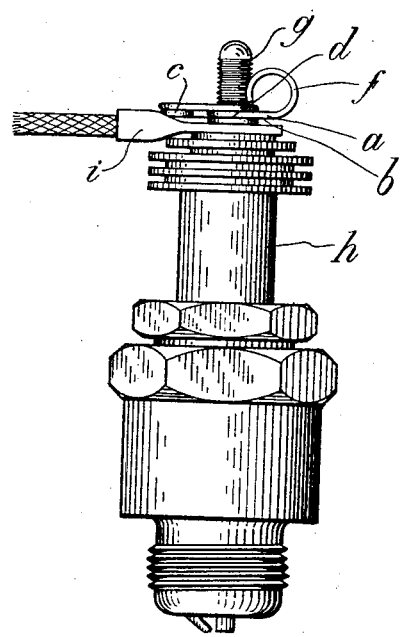
Figure 1 is a side elevation showing a clip embodying the invention attached to a sparking plug and securing thereto a magneto high tension cable.

Referring to the drawing, $a$ denotes in general the wire clip, the wire being made of steel or other suitable metal. The clip is made in one piece and comprises laterally spaced limbs $b$ connected together resiliently at one end thereof by a coiled portion $c$, which may be constituted by bending or winding the wire one or more times, the said portion tending to separate the said limbs. The limbs are also provided, intermediate the free ends thereof and the portion $c$, with coiled inwardly directed portions $d$, which may also be constituted by bending or winding the wire one or more times so as to afford openings $e$ between the limbs, the free ends of the limbs being similarly formed to afford portions $f$ to permit the device to be manipulated by the finger and thumb when attaching or detaching the same, the said portions $f$ being preferably upwardly and outwardly inclined to facilitate such manipulation.

Figure 2:
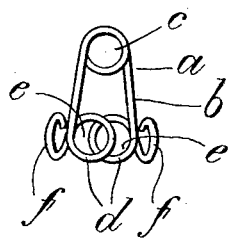
Figure 2 is a plan view of the clip detached.
Figure 3:
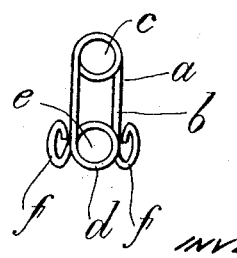
Figure 3 is a plan view of the clip detached but showing the approximate position occupied by the relative parts thereof when the clip is being attached to or detached from the sparking plug or other member with which it co-operates.

In normal position, the portions $d$ slightly overlap one another, as shown in Figure 2, but upon exerting pressure inwardly on the portion $f$, as by finger and thumb, the openings $e$ are brought substantially into alignment, as shown in Figure 3, whereby the device may be applied, for instance, to the screw-threaded terminal $g$ of a sparking plug $h$ and serve to retain a magneto high tension cable $i$ in position with respect thereto, the portions $d$ encircling the said terminal $g$ moving outwardly in opposite directions and effecting a double gripping action on the said terminal $g$, upon manual pressure on the portion $f$ of the device being relaxed, without any tendency of the device to be displaced by vibration.

What I claim is:—

A spring clip of spring wire or the like bent intermediate its ends to form a spring coil, projected at diametrically opposite points of the coil to form limbs, formed at the forward terminal of each limb into a fully closed loop, both loops being between the limbs to permit such loops to be brought into full registry, the terminals of the wire beyond the loops being formed into substantially closed coils, arranged wholly beyond the loops and in planes substantially parallel and at right angles to the planes of the loops.

In testimony whereof I have hereby signed my name.

WILLIAM HARRY LAWLEY.